United States Patent
Wu

(10) Patent No.: US 7,600,552 B2
(45) Date of Patent: Oct. 13, 2009

(54) MULTI-LINK TELESCOPIC COVER

(75) Inventor: Yi-Chun Wu, Taichung County (TW)

(73) Assignee: Keyarrow (Taiwan) Co., Ltd., Taichung (TW)

( * ) Notice: Subject to any disclaimer, the term of this patent is extended or adjusted under 35 U.S.C. 154(b) by 200 days.

(21) Appl. No.: 11/171,304

(22) Filed: Jul. 1, 2005

(65) Prior Publication Data

US 2006/0102296 A1 May 18, 2006

(30) Foreign Application Priority Data

Nov. 8, 2004 (TW) .............................. 93217839 U

(51) Int. Cl.
*E06B 9/00* (2006.01)

(52) U.S. Cl. ...................... 160/222; 160/223

(58) Field of Classification Search .......... 160/185.197, 160/218, 220, 222, 223
See application file for complete search history.

(56) References Cited

U.S. PATENT DOCUMENTS 2,596,850 A * 5/1952 Griffin ..................... 160/368.1

6,488,072 B1 * 12/2002 Wang .......................... 160/222

FOREIGN PATENT DOCUMENTS

| EP | 0963809 A | | 12/1999 |
|----|-----------|---|---------|
| JP | 2002295155 A | * | 10/2002 |
| SU | 1154073 A1 | | 5/1985 |
| TW | 152342 A | | 9/1988 |
| TW | EP 1738867 A | * | 3/2007 |

OTHER PUBLICATIONS

European Search Report dated Jun. 27, 2006.

* cited by examiner

*Primary Examiner*—Katherine W Mitchell
*Assistant Examiner*—Jeremy C Ramsey
(74) *Attorney, Agent, or Firm*—Browdy and Neimark, P.L.L.C.

(57) ABSTRACT

A multi-link telescopic cover includes a cover assembly having a plurality of shield plates fitted in sequence to be extended and telescoped along a telescopic orientation and a link assembly having a set of parallel first linkages, a set of parallel second linkages and four short linkages. The first linkages and the second linkages are crosswise and are tilted relative to the telescopic orientation of the cover assembly. A number of the first linkages is identical to that of the second linkage, and a number of the shield plates less the number of the first linkages is two. Each of the first linkages and the second linkages are connected to three of the continuous shield plates respectively and the short linkages are connected to the first and second shield plates from opposite ends of the cover assembly.

5 Claims, 7 Drawing Sheets

MULTI-LINK TELESCOPIC COVER

BACKGROUND OF THE INVENTION

1. Field of the Invention

The present invention relates generally to a dust-proof device for a machine tool, and more particularly to a multi-link telescopic cover.

2. Description of the Related Art

FIG. 1 shows a conventional dust-proof cover including shield plates 10, 11, 12 . . . with various sizes, which are fitted in sequence. To extend the dust-proof cover, the first shield plate 10 is drawn to draw the second shield plate 11, and then the second shield plate 11 draws the third shield plate 12 . . . . The shield plates of the conventional dust-proof cover move asynchronously in extension and telescoping that causes the drawbacks hereunder:

1. The shield plates makes loud noise when extending and telescoping. The shield plates impact each other when the large shield plate is moved quickly that causes the shield plates shifting.

2. To avoid the noise, the dust-proof cover is provided with plastic blocks for damping. The blocks are damaged by oil or cutting liquid of the machine tool or by the impact of the shield plates.

3. The impact causes the shield plates to be tilted, so that the dust-proof cover is curved in extension condition. After a time of use, the shield plates may be collapsed.

FIG. 2 shows an improved dust-proof cover, which has shield plates 20, 21, 22 . . . and a set of link assemblies 30, 31 . . . pivoted on the shield plates respectively. In extension of the dust-proof cover, the first shield plate 20 is drawn to move the second shield plate 21 via the first link assembly 30, and then the second shield plate 21 moves the third shield plate 22 via the second link assembly 31 . . . . This dust-proof cover has several drawbacks.

In mechanical principle, the distance of the movement of each shield plate is identical to the angle of swing of the corresponding linkages. In manufacture, there must be tolerances between the linkages and between the linkages and the slide ways, so called liberal allowance to move the shield plates smoothly. As a result, the angle of swing of the linkages on the first shield plate is different from that of on the last shield plate. The difference of the angle of the swing of the linkages is greater when the number of the shield plates is greater. In other words, the shield plates still move asynchronously and still are curved.

The link assemblies also have problem of shifting left or shifting right, so that it still has to be improved.

SUMMARY OF THE INVENTION

The primary objective of the present invention is to provide a multi-linked telescopic cover which can increase the parallel moving and the synchronization of shield plates and a linkage of the claimed invention can drive a plurality of shield plates to move at the same time.

According to the objective of the present invention, a multi-link telescopic cover includes a cover assembly having a plurality of shield plates fitted in sequence to be extended and telescoped along a telescopic orientation and a link assembly having a set of parallel first linkages and a set of parallel second linkages. The first linkages and the second linkages are crosswise and tilted relative to the telescopic orientation of the cover assembly. The number of the first linkages is identical to that of the second linkage, and a number of the shield plates less the number of the first linkages is two. Each of the first linkages and the second linkages are connected to three of the continuous shield plates respectively

DETAILED DESCRIPTION OF THE INVENTION

Figure 1:
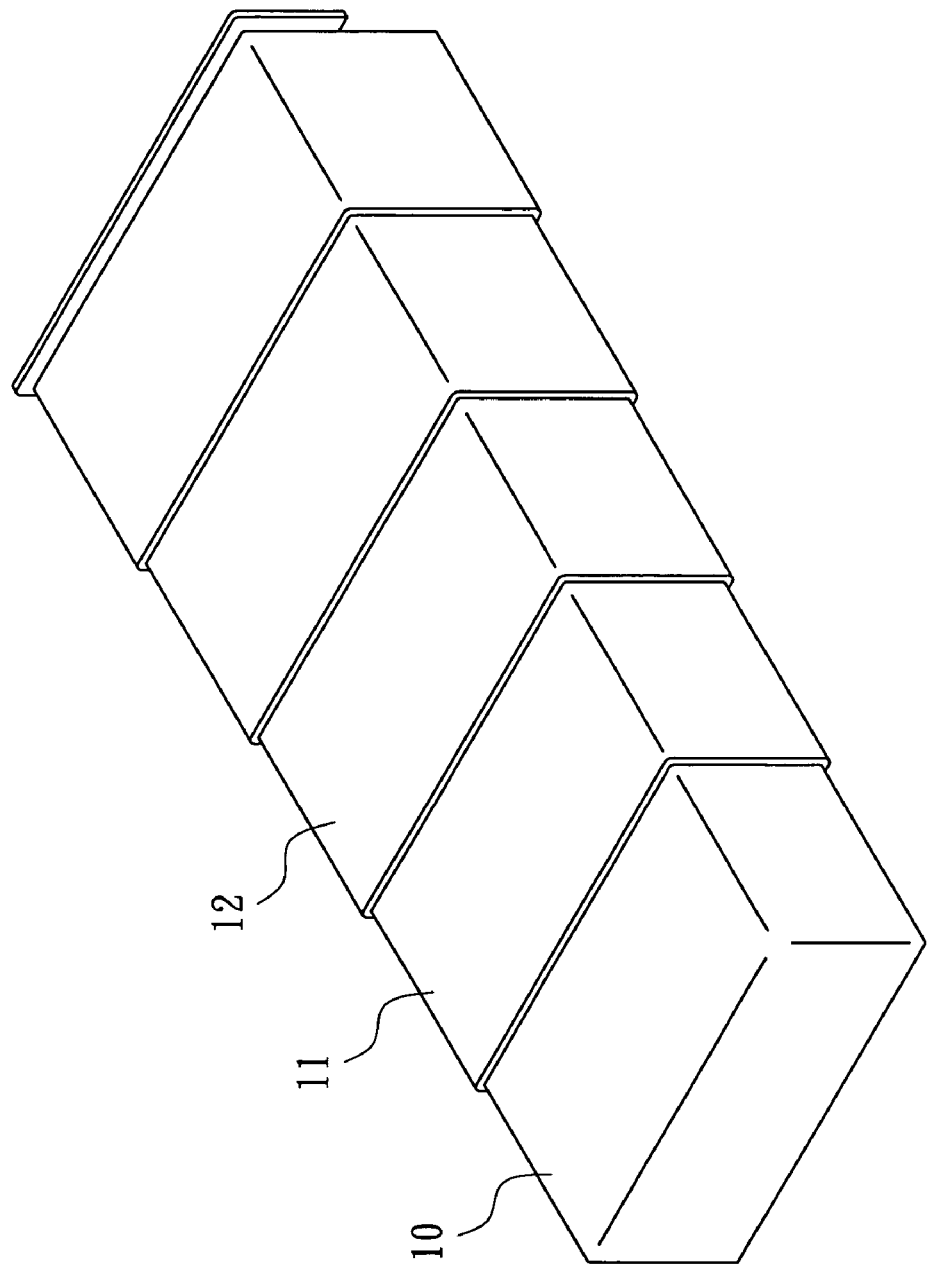
FIG. 1 is a perspective view of the first conventional telescopic cover.
Figure 2:
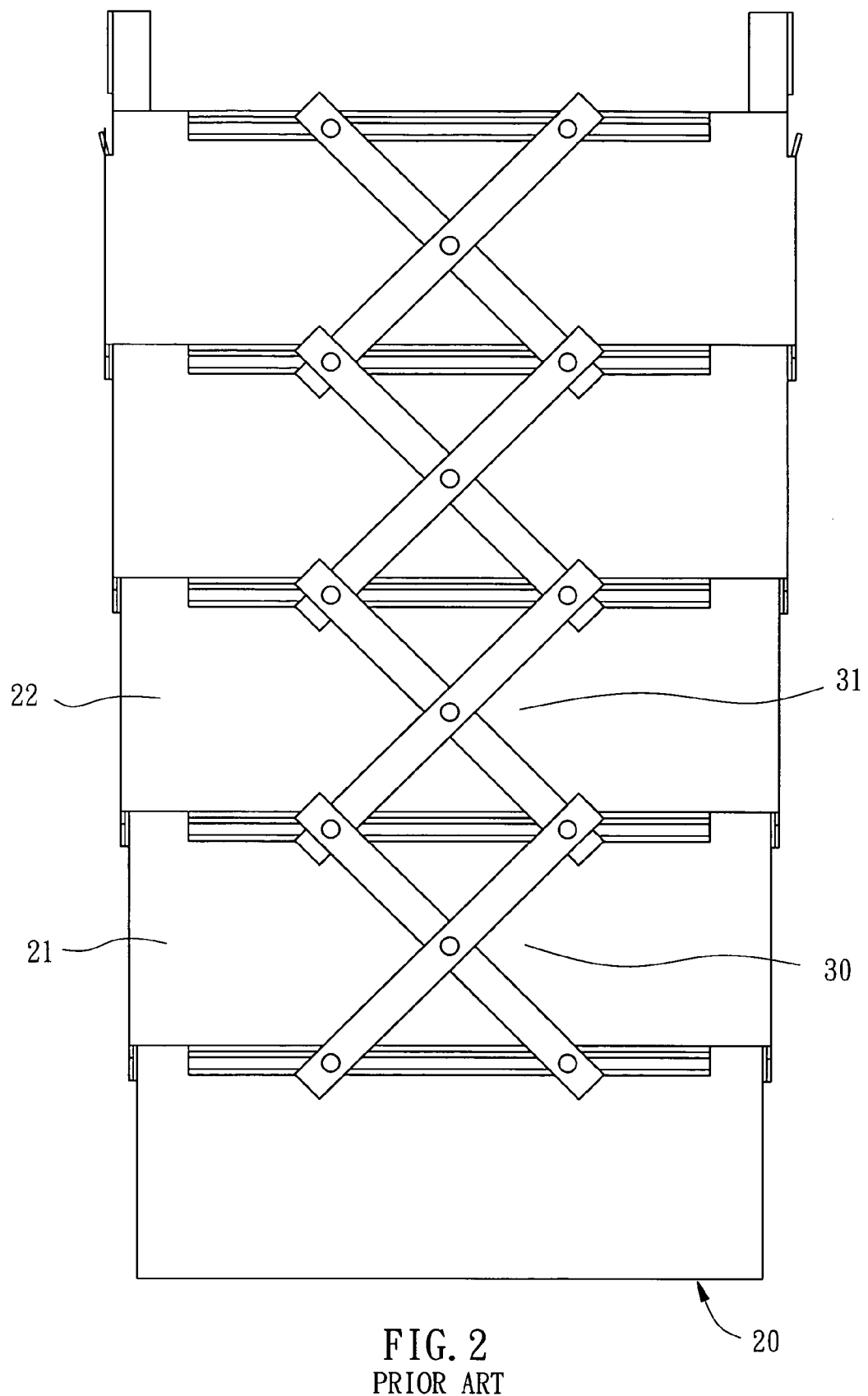
FIG. 2 is a bottom view of the cylinder of the second conventional telescopic cover.
Figure 3:
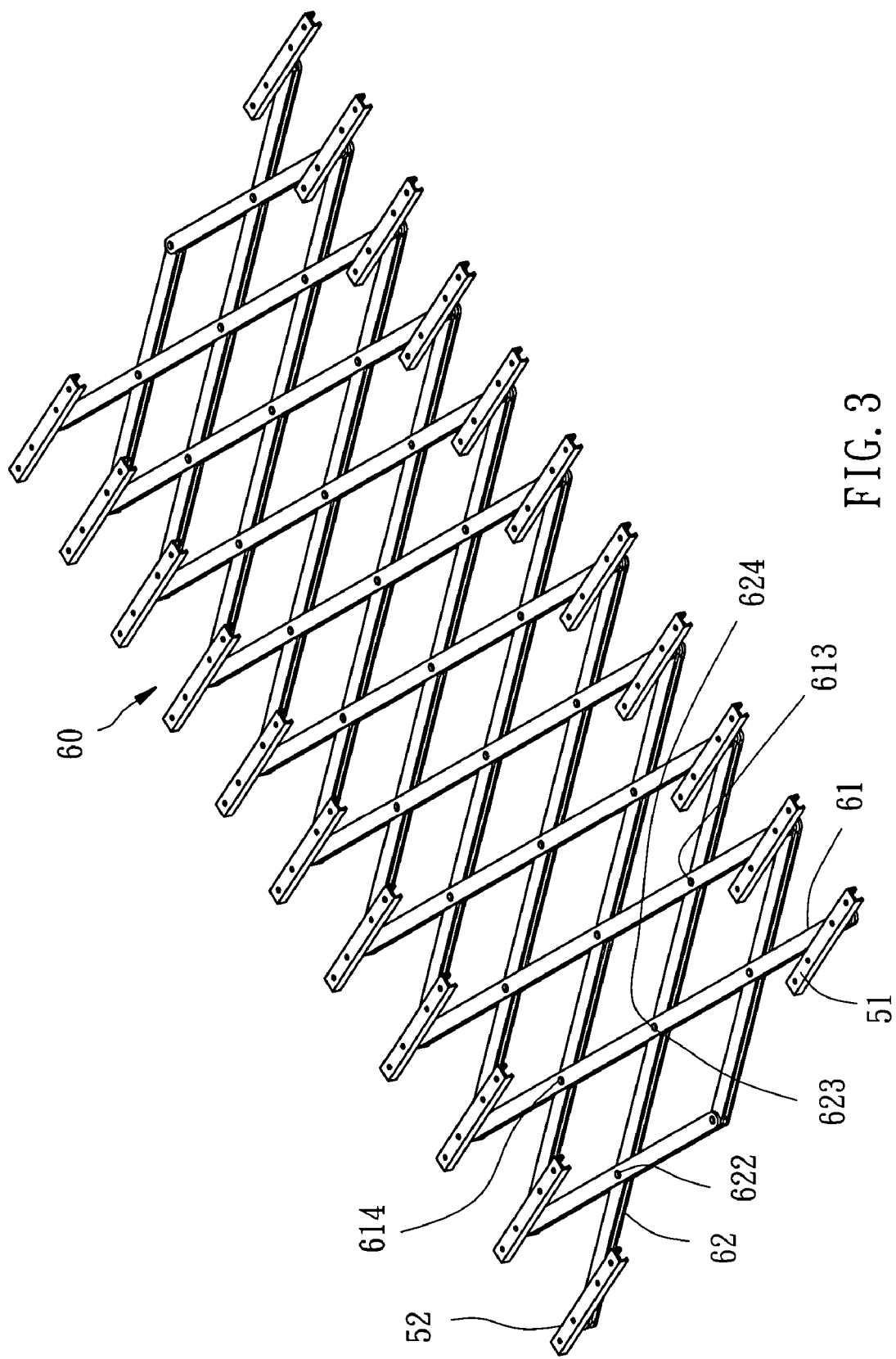
FIG. 3 is a perspective view of the link assembly and the slideways engagable to the shield plates of a first preferred embodiment of the present invention.
Figure 4:
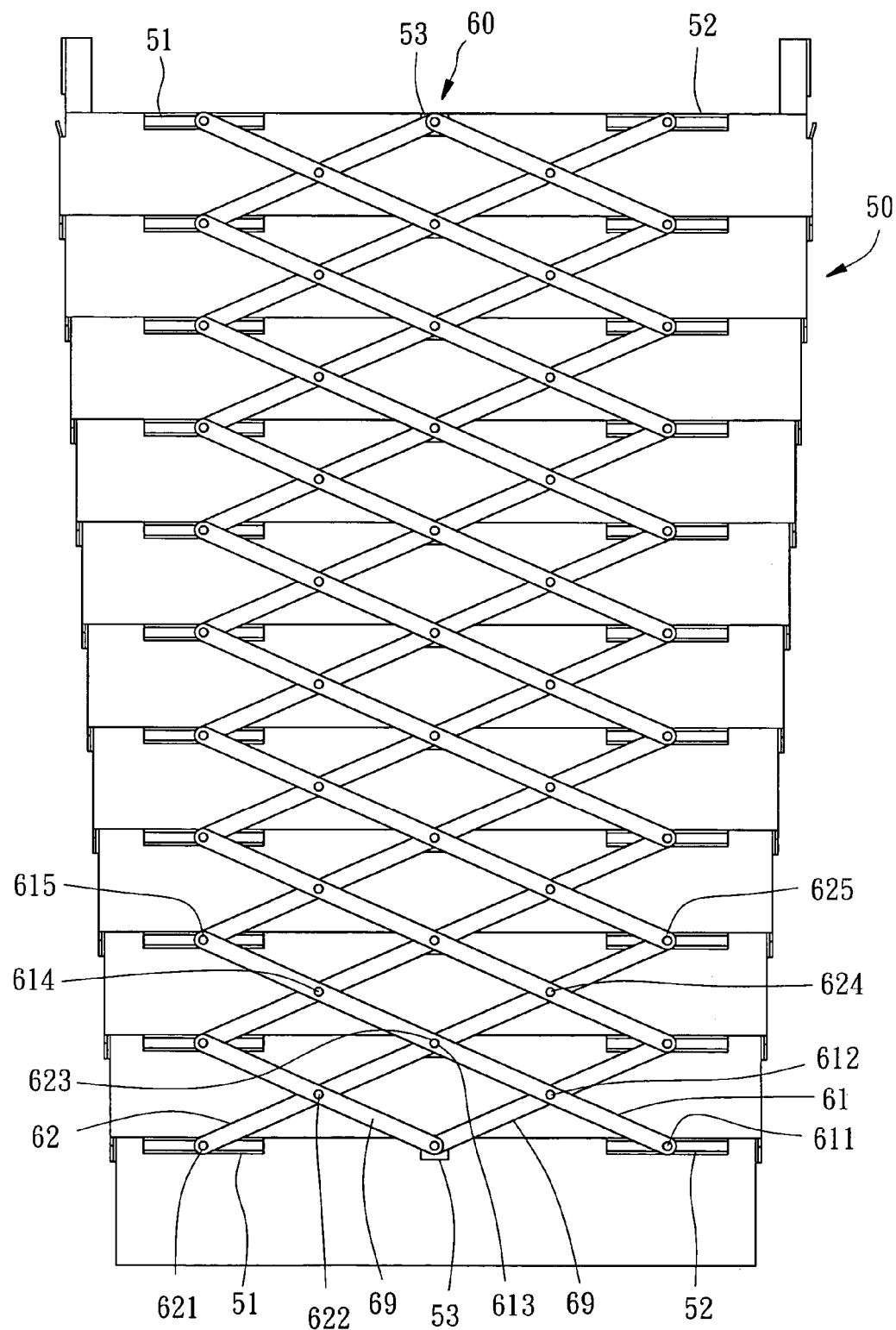
FIG. 4 is a bottom view of the first preferred embodiment of the present invention in the telescoped condition.
Figure 5:
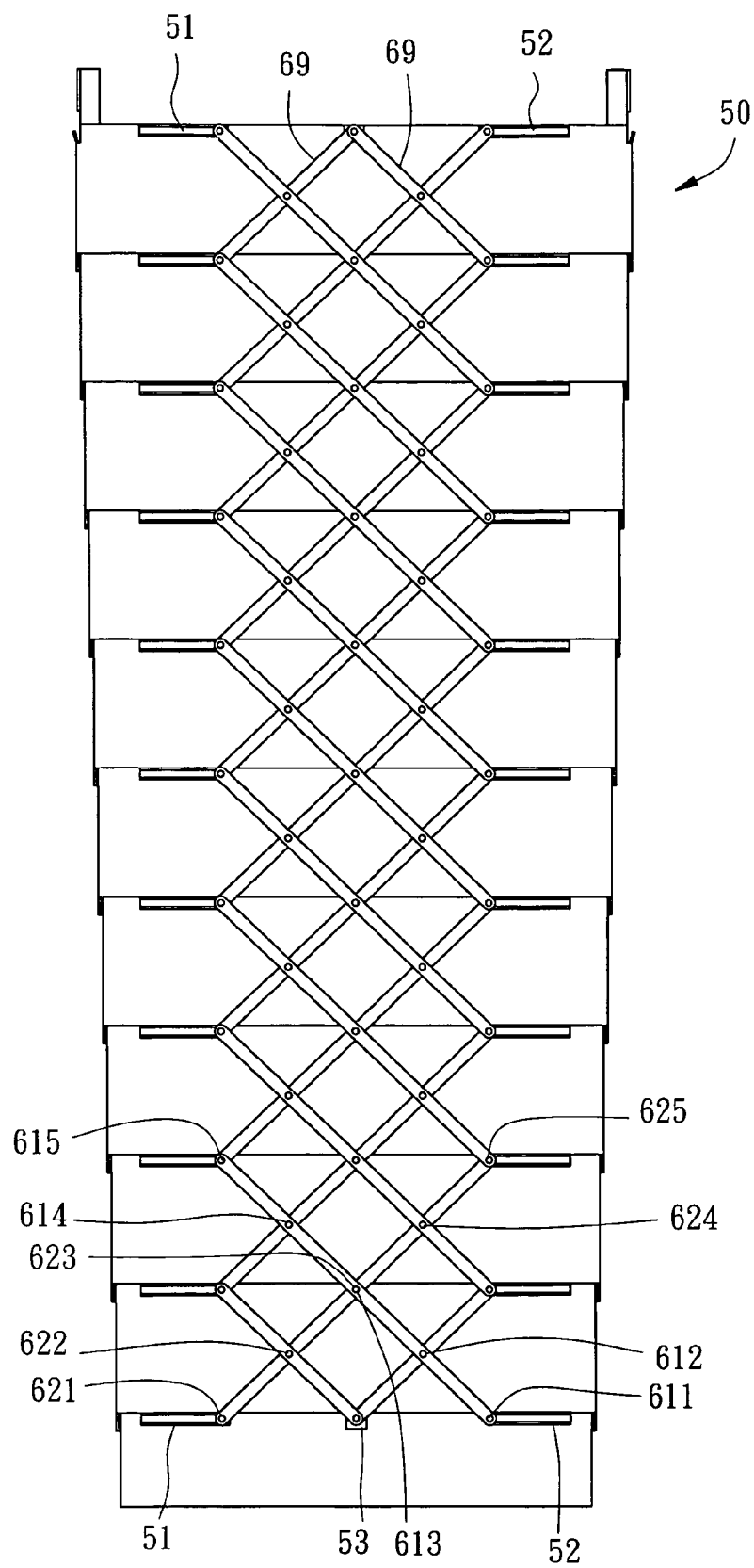
FIG. 5 is a bottom view of the first preferred embodiment of the present invention in the extended condition.

As shown in FIG. 3 and FIG. 4, a multi-link telescopic cover of the first preferred embodiment of the present invention comprises:

A cover assembly 50 consisting of eleven shield plates, which are same in aspects and various in sizes. The shield plates are fitted in sequence to be extended and telescoped along a telescopic orientation. The cover assembly 50 has a first end with the greatest shield plate and a second end with the smallest shield plate. Each of the shield plates has two slots fixed on the surface of the shield plates, which are a left slide way 51 and a right slide way 52 and a pivot 53 between the slide ways 51 and 52 all of which lie in a plane perpendicular to the respective shield plate as shown in FIG. 4. The slide ways 51 and 52 have orientations particular to a direction of the shield plates extending and telescoping.

A link assembly 60 includes nine first linkages 61, nine second linkages 62 and four third linkages 69. The first linkages 61 and the second linkages 62 are two sets of parallel linkages, which are tilted to opposite directions respectively. Two of the third linkages 69 have an end pivoted on the pivot 53 of the first shield plate and an end jointed with the left and right slide ways 51 and 52 of the second shield plate. The other two of the third linkages 69 are pivoted on the eleventh shield plate and the tenth shield plate symmetrically. Each of the first and second linkages 61 and 62 has five pivot portions 611, 612, 613, 614, 615, 621, 622, 623, 624 and 625 from an end to the other end of the linkage. The first pivot portions 611 of the first linkages 61 are jointed with the left slide ways 51 of the first shield plate to that of the ninth shield plate, and the fifth pivot portions 615 of the first linkages 61 are jointed with the right slide ways 52 of the third shield plate to that of the eleventh shield plate. The first pivot portions 621 of the second linkages 62 are jointed with the right slide ways 52 of the first shield plate to that of the ninth shield plate, and the fifth pivot portions 625 of the second linkages 61 are jointed with the left slide ways 51 of the third shield plate to that of the eleventh shield plate. The third pivot portions 613, 623 of the first linkages 61 and the second linkages 62 are pivoted on the pivots 53 of the second shield plate to that of the tenth shield plate respectively. The second pivot portions 612 of the first linkages 61 are jointed with the third linkage 69 and the fourth pivot portions 624 of the second linkages 62 respectively, and the fourth pivot portions 614 of the first linkages 61 are jointed with the third linkage 69 and the second pivot portions 622 of the second linkages 62 respectively.

Each of the first and second linkages 61 and 62 connect three of the neighboring shield plates, in other words, the first, second and third shield plates move synchronously, and the second, third and fourth shield plates move synchronously . . . . As a result, when the first shield plate is drawn or pushed, the rest of the shield plates of the cover assembly 50 are moved synchronously with the first shield plate. The power transmission of the shield plates of the cover assembly 50 of the present invention is identical, synchronous and overlapped that increases the synchronism and parallel degree of the shield plates and decreases the impact between the shield plates. As a result, there is no need for the damping block as the conventional device provided to eliminate impact and noise, and no need for the fee of replacement and maintenance of the damping blocks.

When extension or telescoping of the shield plates of the cover assembly 50, each of the shield plates is moved by two sets of three parallel forces provided by the linkages (the conventional device only has single or two parallel forces) that decreases the shield plates shaking in movement. As a result, the shield plates of the cover assembly 50 moves in a straight and smooth motion without tilting and twisting.

Figure 6:
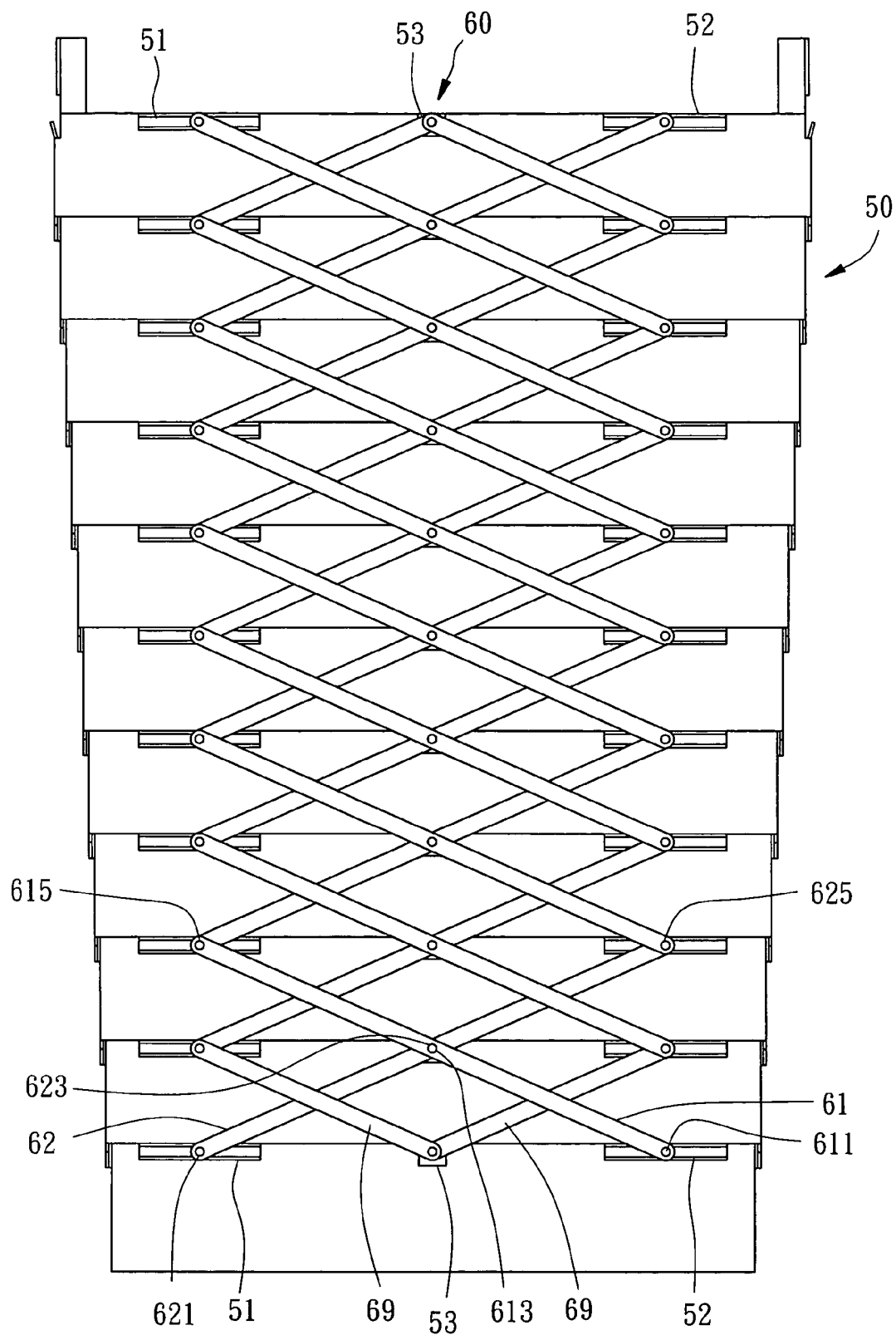
FIG. 6 is a bottom view of a second preferred embodiment of the present invention.

FIG. 6 shows a multi-link telescopic cover of the second preferred embodiment of the present invention, which is similar to the telescopic cover of the first preferred embodiment, except that there is no second and fourth pivot portion on the first and second linkages 61 and 62.

Figure 7:
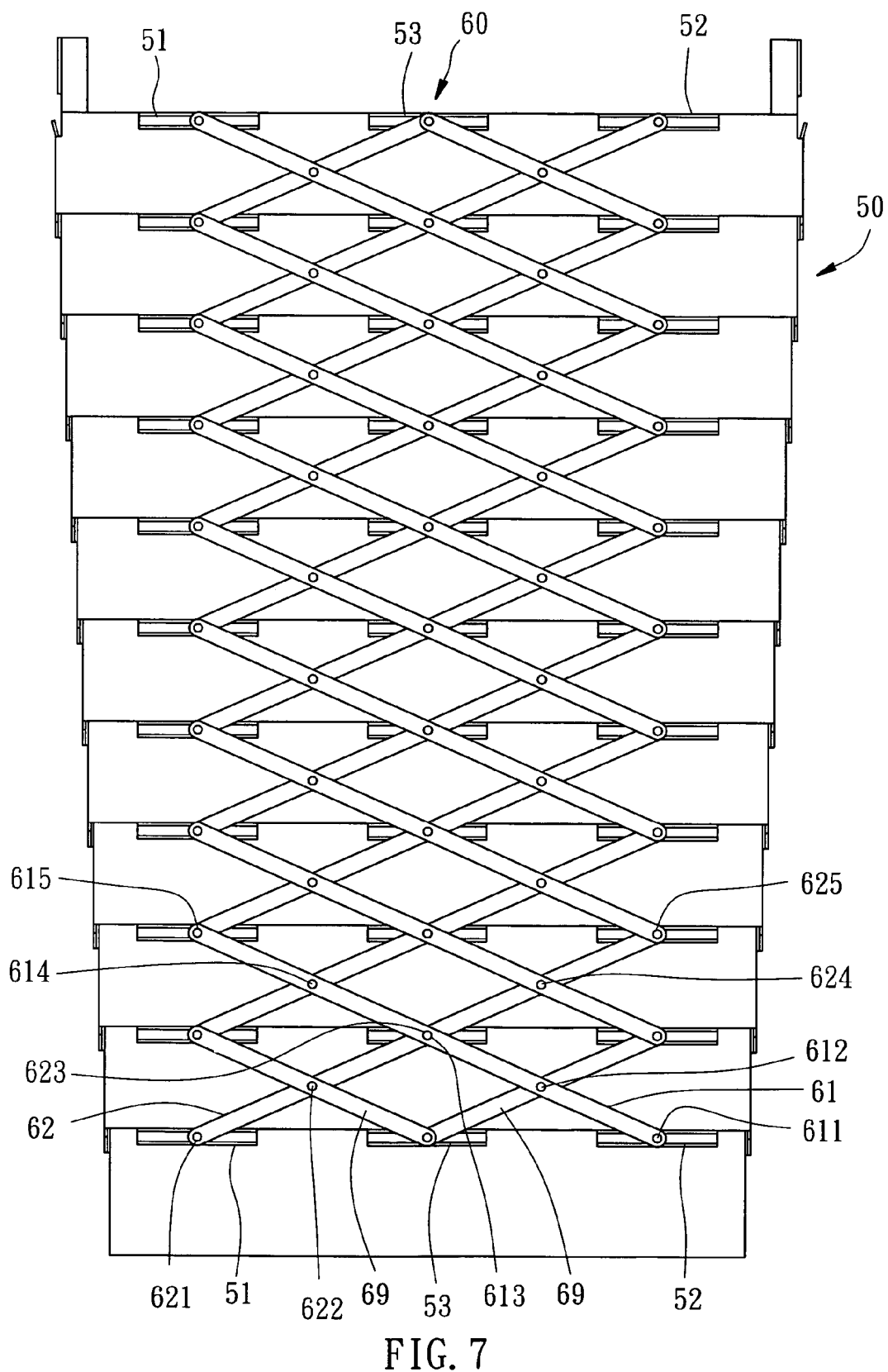
FIG. 7 is a bottom view of a third preferred embodiment of the present invention.

FIG. 7 shows a multi-link telescopic cover of the third preferred embodiment of the present invention, which is similar to the telescopic cover of the first preferred embodiment, except that the middle pivot portions 53 on the shield plates are slide ways, with which the third pivot portions 613 and 623 of the first and second linkages 61 and 62 are engaged. There is a restriction mechanism in the slide ways respectively that serve the same function as above.

What is claimed is:

1. A multi-link telescopic cover, comprising:
    a cover assembly, which has a plurality of shield plates fitted in sequence, which gradually decrease in size to be extended and telescoped, wherein the cover assembly has a first end and a second end, and each of the shield plates has a right slide way and a left slide way, each of which are slots fixed to the front surface of the shield plate and a middle pivot midway between the right and the left slide ways;
    wherein the right slide way, the left slide way and the middle pivot all are spaced apart from each other in a plane perpendicular to the shield plate;
    a link assembly having a set of parallel first linkages and a set of parallel second linkages, wherein the first linkages and the second linkages are in abutting engagement crosswise;
    the first linkages having first ends pivotly and slideably engaged in the left slide way of the first shield plate from the first end of the cover assembly to the third shield plate from the second end of the cover assembly respectively, and having second ends pivotly and slideably engaged in the right slide way of the third shield plate from the first end of the cover assembly to the first shield plate from the second end of the cover assembly respectively, and having middles pivotly engaged on the middle pivot of the second shield plate from the first end of the cover assembly to the second shield plate from the second end of the cover assembly respectively;
    the second linkages having first ends pivotly and slideably engaged in the right slide way of the first shield plate from the first end of the cover assembly to the third shield plate from the second end of the cover assembly respectively, and having second ends pivotly and slideably engaged in the left slide way of the third shield plate from the first end of the cover assembly to the first shield plate from the second end of the cover assembly respectively, and having middles pivotly engaged on the middle pivot of the second shield plate from the first end of the cover assembly to the second shield plate from the second end of the cover assembly respectively.

2. The multi-link telescopic cover as defined in claim 1, wherein the link assembly further comprises four short linkages having ends respectively pivotly engaged in the middle pivot of the first shield plates from the first end and from the second end of the cover assembly and the right slide way and the left slide way of the second shield plates from the first end and from the second end of the cover assembly respectively.

3. The multi-link telescopic cover as defined in claim 1, wherein the first linkages are in abutting engagement with the second linkages, wherein each of the first linkages respectively cross the first end, the second end and the middle of the second linkages and each of the second linkages respectively cross the first end, the second end, and the middle end of the first linkages.

4. The multi-link telescopic cover as defined in claim 1, wherein the middle pivot of the shield plates are slide ways, in which the middles of the first linkages and the second linkages are slid.

5. A multi-link telescopic cover, comprising: a cover assembly having a plurality of shield plates fitted in sequence to be extended and telescoped along a telescopic orientation and a link assembly having a set of parallel first linkages and a set of parallel second linkages, wherein the first linkages and the second linkages are in abutting engagement crosswise and are tilted relative to the telescopic orientation of the cover assembly, and a number of the first linkages are identical to that of the second linkage, and the plurality of the shield plates less the number of the first linkages is two, and each of the first linkages and the second linkages are respectively connected to three of the plurality of shield plates fitted in sequence.

* * * * *